United States Patent
Terry

(10) Patent No.: US 9,408,016 B2
(45) Date of Patent: Aug. 2, 2016

(54) REMOTE CONTROL APPLICATION FOR WIRELESS BOOSTER

(71) Applicant: Wilson Electronics, LLC, St. George, UT (US)

(72) Inventor: Scott Terry, Norcross, GA (US)

(73) Assignee: WILSON ELECTRONICS, LLC, St. George, UT (US)

( * ) Notice: Subject to any disclaimer, the term of this patent is extended or adjusted under 35 U.S.C. 154(b) by 6 days.

(21) Appl. No.: 14/171,974

(22) Filed: Feb. 4, 2014

(65) Prior Publication Data

US 2015/0011208 A1 Jan. 8, 2015

Related U.S. Application Data

(60) Provisional application No. 61/842,407, filed on Jul. 3, 2013.

(51) Int. Cl.

| | |
|---|---|
| H04B 7/15 | (2006.01) |
| H04W 4/00 | (2009.01) |
| H04B 7/155 | (2006.01) |
| H04L 12/24 | (2006.01) |
| H04W 84/04 | (2009.01) |

(Continued)

(52) U.S. Cl.
CPC .............. *H04W 4/008* (2013.01); *H04B 7/1555* (2013.01); *H04B 7/15535* (2013.01); *H04L 41/00* (2013.01); *H04L 41/0806* (2013.01); *H04L 41/0813* (2013.01); *H04L 67/125* (2013.01); *H04M 1/7253* (2013.01); *H04M 1/72533* (2013.01); *H04M 2250/02* (2013.01); *H04W 84/047* (2013.01)

(58) Field of Classification Search
USPC .............. 455/418–422.1, 423, 11.1–16, 41.2, 455/513, 63.4, 86–88, 115.1–115.4
See application file for complete search history.

(56) References Cited

U.S. PATENT DOCUMENTS

| | | | | |
|---|---|---|---|---|
| 5,924,022 A | * | 7/1999 | Beasley | ................. H04B 7/082 370/315 |
| 6,731,904 B1 | * | 5/2004 | Judd | ...................... H01Q 1/007 455/11.1 |

(Continued)

OTHER PUBLICATIONS

International Search Report; International Application No. PCT/US2014/014637; International Filing Date: Feb. 4, 2014; Date of Mailing: Apr. 29, 2014; 5 pages.

(Continued)

*Primary Examiner* — Dai A Phuong
(74) *Attorney, Agent, or Firm* — Thorpe North & Western LLP

(57) ABSTRACT

A remote control application for remotely a wireless signal booster is located on a remote device, such as a mobile telephone, tablet or computer. The remote control application utilizes a short-range communication interface, such as Bluetooth. This interface allows the user to autonomously register and remotely monitor the performance of the booster and can typically be used to configure, control, enable, shut down, and perform other operations related to the booster, such providing customer support, product registration, and other types of support for the booster operation. The system is most effective when the external device is a mobile device receiving telecommunication service through the repeater. In this case, the mobile device simultaneously displays two signal strength indicators, one for signals received by the mobile device itself and the other for signals received by the tower-side antenna of the wireless repeater.

13 Claims, 3 Drawing Sheets

(51) Int. Cl.
*H04L 29/08* (2006.01)
*H04M 1/725* (2006.01)

(56) References Cited

U.S. PATENT DOCUMENTS

| | | | |
|---|---|---|---|
| 6,757,189 B2 | 6/2004 | Hung et al. | |
| 7,010,325 B1* | 3/2006 | Oh | 455/557 |
| 7,209,703 B1* | 4/2007 | Yarkosky | 455/9 |
| 7,280,799 B1* | 10/2007 | Najafi | H04B 7/15578 343/727 |
| 7,565,106 B1* | 7/2009 | Oh | H04B 7/155 370/241 |
| 8,121,535 B2* | 2/2012 | Proctor, Jr. | H04B 7/15542 455/11.1 |
| 8,224,241 B1 | 7/2012 | Gunasekara et al. | |
| 8,611,813 B1* | 12/2013 | Harvey et al. | 455/13.1 |
| 2002/0028655 A1* | 3/2002 | Rosener et al. | 455/16 |
| 2003/0157894 A1* | 8/2003 | Han | H04B 17/40 455/67.11 |
| 2005/0272367 A1* | 12/2005 | Rodgers et al. | 455/11.1 |
| 2006/0141928 A1* | 6/2006 | Hosokawa | H04B 17/40 455/9 |
| 2007/0197207 A1* | 8/2007 | Carstens et al. | 455/423 |
| 2008/0039012 A1* | 2/2008 | McKay | H04B 7/1555 455/11.1 |
| 2008/0274393 A1* | 11/2008 | Markoski | H01B 1/122 429/401 |
| 2008/0274693 A1* | 11/2008 | Seo et al. | 455/25 |
| 2011/0007637 A1* | 1/2011 | Chen et al. | 370/252 |
| 2011/0026452 A1 | 2/2011 | Kang et al. | |
| 2011/0151771 A1* | 6/2011 | Son | H04B 17/27 455/9 |
| 2012/0289243 A1 | 11/2012 | Tarlow et al. | |
| 2013/0142222 A1 | 6/2013 | Wang et al. | |

OTHER PUBLICATIONS

Written Opinion; International Application No. PCT/US2014/014637; International Filing Date: Feb. 4, 2014; Date of Mailing Apr. 29, 2014; 5 pages.

* cited by examiner

REMOTE CONTROL APPLICATION FOR WIRELESS BOOSTER

PRIORITY CLAIM TO RELATED APPLICATION

This application claims priority to commonly-owned U.S. Provisional Patent Application Ser. No. 61/842,407 entitled "Wireless Connection to RF Booster," filed on Jul. 3, 2013.

TECHNICAL FIELD

The present invention relates to the field of wireless repeaters also known as wireless signal boosters for duplex communication systems and, more particularly, to a remote control application, such as a mobile app, for monitoring and controlling a wireless signal booster.

BACKGROUND

Wireless communication systems have become widely deployed throughout the United States and abroad. A wireless repeater, also referred to as signal booster, is a radio frequency (RF) device used to amplify wireless communication signals in both the uplink and downlink channels. These devices typically include circuits for varying the operation of the amplifier based on the conditions around the amplifier and the antennas. The booster itself typically includes a number of user interface indicators such as LEDs or an LCD display and buttons, knobs or screen tools for monitoring and controlling the device. These interfaces are generally limited in functionality and may require reference to a user manual to understand the protocol for operating the device. When remote antennas are utilized, the booster itself may be placed in a location where it is not readily visible or conveniently accessible, such as a utility closet or attic. In configurations where one or both of the RF antennas are physically attached to the amplifier, the placement and orientation of the amplifier and associated antenna can significantly affect the operational performance of the booster. There is, therefore, a need for more convenient and effective mechanism for monitoring and controlling wireless signal boosters.

SUMMARY OF THE INVENTION

The present invention meets the needs described above in wireless repeater system including a remote control application for autonomously registering, remotely monitoring, and controlling a wireless signal booster. The remote control application typically utilizes a short-range antenna, such as Bluetooth, Wi-Fi, Zigbee, or other similar wireless interface to monitor and control the booster from an external device. The external device can be a computer, tablet, mobile phone or other device configured with a signal booster remote control application. This interface allows the mobile device to remotely monitor the performance of the booster and can typically be used to configure, control, enable, activate, shut down, and perform other operations related to the booster, such providing customer support, product registration, and other types of support for the booster operation. The system is most effective when the external device is a mobile device receiving telecommunication service through the repeater. In this case, the mobile device simultaneously displays two signal strength indicators, one for signals received by the mobile device itself and the other for signals received by the tower-side antenna of the wireless repeater. The signal strength information for signals received by the repeater is transmitted to the mobile device over the short-range antenna without utilizing the tower-side or mobile-side antennas of the wireless repeater.

In a particular embodiment, a wireless repeater system includes a wireless repeater having a base unit, a tower-side antenna, a mobile-side antenna, and a short-range antenna. An external device communicates with the wireless repeater via the short-range antenna allowing a remote booster application running on the wireless repeater to autonomously register and operate cooperatively with a remote booster application running on the external device via communications transmitted over the short-range antenna. A first signal strength indicator located on the external device displays signal strength information received from the wireless repeater. The signal strength information is transmitted from the wireless repeater to the external device via the short-range antenna without utilizing the tower-side antenna or the mobile-side antenna.

Typically, the first signal strength indicator displays signal strength information for communications received by the wireless repeater via the tower-side antenna. The external device may also receive communications from the wireless repeater via the mobile-side antenna. In this case, the external device includes a second signal strength indicator displaying signal strength information for the communications received by the external device from the mobile-side antenna of the wireless repeater. The first and second signal strength indicators are displayed simultaneously on the external device where they can be observed by a user in a common field of view.

The remote booster application running on the external device may also implement remote control functionality allowing the external device to remotely control the wireless booster via communications transmitted over the short-range antenna without utilizing the tower-side antenna or the mobile-side antenna. For example, the remote booster application running on the external device may control the gains of the repeater. The external device may also operate as an intermediary communication entry point for accessing the booster via communications transmitted from the external device to the booster over the short-range antenna. The specific techniques and structures for implementing particular embodiments of the invention, and thereby accomplishing the advantages described above, will become apparent from the following detailed description of the embodiments and the appended drawings and claims.

DETAILED DESCRIPTION OF THE EMBODIMENTS

Figure 1:
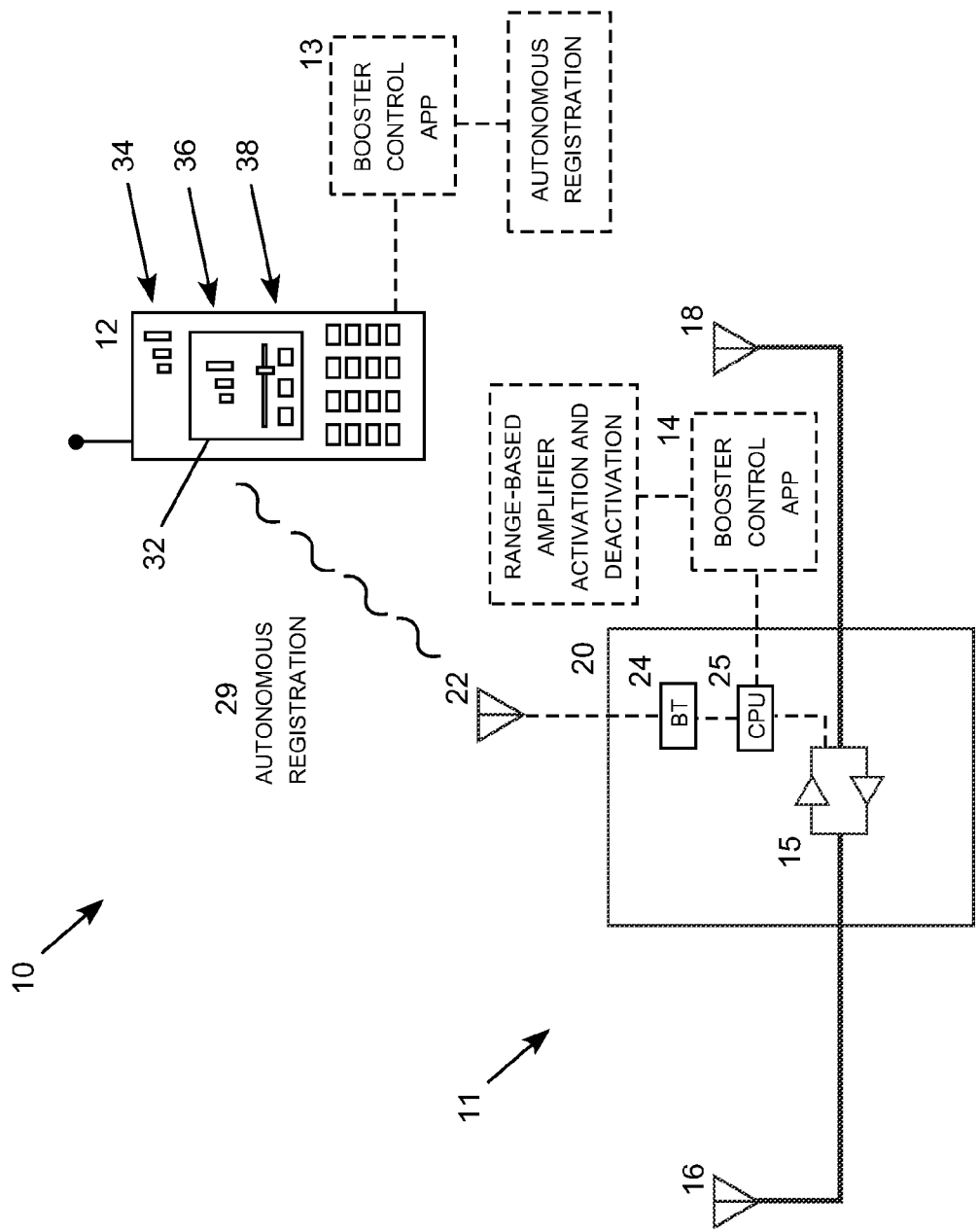
FIG. 1 is a conceptual block diagram showing a remote control application for a wireless signal booster in accordance with an embodiment of the invention.

Embodiments of the invention may be realized in a remote control application for remotely controlling and monitoring the signal strength experienced at a wireless signal booster (also referred to as a wireless repeater), which amplifies and repeats mobile telephone service communications to improve the signal strength provided to a mobile telephone. The wireless repeater includes a short-range antenna, a tower-side antenna, a mobile-side antenna, and a base unit housing a bidirectional amplifier that amplifies and repeats duplex telecommunication signals transmitted over the tower-side and mobile-side antennas. The remote control application typically utilizes a short-range communication interface, such as Bluetooth, Wi-Fi, Zigbee, or other similar wireless interface that supports local wireless communications to monitor and control the booster from the external device. This external device can be a mobile phone, computer, tablet, or other device configured with a signal booster remote control application that works cooperatively with software residing on the signal booster. A user interface displayed on the external device allows the user to monitor the signal strength registered by the booster and can be used to configure, adjust the gain, otherwise control, enable, shut down, and cause the booster to perform other operations. The external device may also be operated as an intermediary communication entry point between the booster and a remote support application located apart from the external device providing services to the booster, such customer support, product registration, software downloads, troubleshooting and support functions for the booster. For example, the remote support application running on a service provider or other support computer may communicate with the mobile device 12 via overhead data signals transmitted through the repeater via the tower-side antenna 16 and the mobile-side antenna 18, and on to the mobile device 12. The mobile device, in turn, may serve as an intermediary communication entry point for controlling and configuring, and troubleshooting the booster via communications transmitted from the mobile device to the booster over the short-range antenna 22. The mobile device 12 may also be configured to communicate with the remote support application via another communication path, such as a different frequency channel, a Wi-Fi data link providing Internet access, a modem providing Internet access, or any other suitable link providing the mobile device 12 with Internet access. The mobile device 12 may also communicate with the remote support application using a link other than the Internet, such as an intranet, private network, hardwired connection, or any other suitable communication medium.

In a particular embodiment, the remote control application is configured as a mobile app running on the same mobile device that receives amplified communication signals from the signal booster. In this case, the mobile device includes a signal strength display for the mobile device displayed along with a similar signal strength display for the booster provided by the mobile app. The user's ability to see both signal strength displays in the same field of view is convenient and improves the user's ability to understand of how configuration changes, such adjusting the booster gain and moving or reorienting the antennas, affect the signal strength experienced at the booster as well as the mobile device.

The mobile app also allows the mobile device to remotely implement control functions for the booster, such as an on/off switch, channel selector, antenna direction control, and power controls. The mobile app therefore allows the user to hold the mobile device in a location where good communication service desired, adjust the booster controls, and view the resulting changes in signal strength for the booster and the mobile device simultaneously. This is particularly useful when two people are working together to position the booster antennas, which may include positioning and orienting the amplifier when one of the antennas in integral with the amplifier, to provide the best communication service to a particular location within the user's premises.

To provide an illustrative example, a first person may vary the location and pointing direction of the tower-side antenna at an attic or roof location, while a second person in a basement office location where improved communication coverage is desired simultaneously views the communication coverage effect on the signal strength indicators for the booster and the mobile device, which are simultaneously displayed on the mobile device. This allows the user to determine whether poor signal service at the mobile device is due to poor signal service at the booster (resulting in poor signal strength at both the repeater and the mobile device) or due to signal loss in the communication link between the booster and the mobile unit (resulting in high signal strength at the repeater but poor signal strength at the mobile device). The second person may similarly vary the pointing direction of the mobile-side antenna in the basement location while viewing the communication coverage effect on the combined signal strength indicators for the booster and the mobile device. During this process, the second person may also adjust the gain of the amplifier and other parameters through the mobile app running on the mobile device to find the best locations and pointing directions for the antennas.

In a particular embodiment, the remote control application is configured as a mobile app running on the same mobile device that receives amplified communication signals from the signal booster. The mobile device includes a signal strength display (typically the well-known "bars" display) for the mobile device itself, displayed along with a similar signal strength display for the booster provided by the mobile app. The mobile app also provides remote booster controls, such as an on/off switch, channel selector, gain controls and, in certain models antenna direction control. The mobile app allows the user to hold the mobile device in a location where good communication service desired, adjust the booster controls, and view the resulting changes in signal strength for the booster and the mobile device simultaneously. This is particularly useful when two people are working together to position the booster antennas, which includes positioning the amplifier when one of the antennas in integral with the amplifier, to provide the best communication service to a particular locations within the customer's premises.

The mobile unit may also be configured to activate the booster automatically upon powering up or upon detecting of a low signal level. The wireless repeater may therefore register its presence with the remote control application running on the mobile unit, which may be performed with or without initially activating the bidirectional amplifier, to allow the mobile unit to activate the bidirectional amplifier of the wireless repeated on a basis determined by the mobile unit. For example, to prompt the repeater to activate the bidirectional amplifier, the remote control application running on a powered up wireless telephone may periodically transmit an autonomous registration signal on the short-range (e.g., Bluetooth) channel effectively requesting registration with any wireless repeater in range. A wireless repeater receiving the autonomous registration signals via its short-range antenna verifies that it supports the wireless device including the main telecommunication channel transmitted over the tower-side and mobile-side antenna and any other relevant protocols (e.g., communication encoding, error checking, carrier license requirement, etc.). Alternatively, the mobile repeater may be configured to periodically transmit an autonomous registration signal on the short-range channel searching for the presence of a wireless repeater within the short-range single range. In either case, the mobile repeater and the mobile device autonomously register so that the repeater can activate the bidirectional amplifier for the main telecommunication channel only when a wireless device that it supports is within range of the short-range communication channel.

If the booster supports the wireless device, the booster activates the bidirectional amplifier in response to the autonomous registration signals. The wireless repeater also deactivates the bidirectional amplifier in response to absence of the autonomous registration signals for a predetermined period. In addition, if any communication parameters are selectable, such as the main communication frequency or other parameters, the repeater and the mobile device may set those parameters cooperatively to provide the best available signal quality to the mobile device. The registration process typically includes a handshake in which the booster and the mobile unit exchange information typically including identification information and operational information including one or more frequencies that the devices support. This may allow the devices to switch to a channel, communication protocol, error checking protocol, or other parameter that they both support. Either or both of the devices may also be configured to change any or the parameters in an attempt to obtain and maintain the best available signal level and other service parameters given the available options. In particular, the devices may vary the parameters with options to identify the best available parameter settings at the time of registration or amplifier activation. The devices may also change those parameters on an ongoing basis in response to a poor signal level at the booster or the mobile unit, such as frequency channel hopping in response to low a tower signal level experiences at the repeater. The devices may be further configured to periodically vary parameters in an attempt to improve the service quality, for example when the devices have recently been in service but are not presently conducting telecommunications in a "between call" service optimization procedure.

FIG. 1 is a conceptual block diagram showing a wireless signal booster system 10 including a wireless signal booster 11 that provides amplified bidirectional wireless communication service to a mobile device 12. A remote control application 13 running on the mobile device 12 cooperates with a corresponding remote control application 14 running the booster to allow the mobile device to monitor and control the operation of the booster. The booster 11 and the mobile device 12 may be conventional with the exception of the applications 13, 14 implementing the remote control functionality. While the remote control functionality preferably operates on the same mobile device that receives amplified bidirectional wireless communication service from the booster, it will be appreciated that it could also be implemented any other suitable computing device, such as a mobile device that is not receiving service from the booster including a tablet, laptop computer, or home area network device.

The booster 11 includes a base unit 20 housing a bidirectional amplifier 15, along with a tower-side antenna 16 and a mobile-side antenna 18. The tower-side antenna 16 is configured to communicate with one or more wireless base station antennas and the mobile-side antenna 18 is configured to communicate with one or more devices. The bidirectional amplifier 15 amplifies the communication signals is both direction (referred to as uplink and downlink) and may be further configured to communicate wireless service from different service providers operating on different frequencies and, in some cases, using different encoding protocols. A central processing unit 25, which controls the operation of the base unit 20, is connected to a blue tooth interface 24 that communicates functions implemented by the remote control application for 14 over a short-range antenna 22. The remote control application for 14 running on the base unit 20 communication over the short-range antenna 22 on the booster and the short-range antenna on the mobile device, such as Bluetooth, Wi-Fi, Zigbee, or other allowing the remote control application for 14 to cooperate with a corresponding remote control application 13 running the mobile device 12 allowing the mobile device to remotely monitor and control the operation of the base unit.

There are several factors that determine how well the booster 11 will affect the RF signal quality and impact the quality of the communication service received by the mobile unit 12. These factors generally include the strength of the input signals received by the tower-side antenna, the amount of RF separation between the antennas 16 and 18, the gain applied by the bidirectional amplifier 15 in each direction (uplink and downlink), and the underlying signal quality such as the bit rate, error rate, and so forth. There may be other factors impacting the signal quality, such as the distance from the mobile-side antenna 18 to the mobile unit 12, sources of signal reflection and interference within the premises, and so forth. Many of these factors can be directly affected by positioning and orientation of the antennas 16 and 18 as wells as the location of mobile unit 12 within the premises. The remote control application 13 running on the mobile device 12 therefore provides a convenient way for the user to monitor the performance of the booster and the mobile device from a common interface while changing these parameters, typically by physically varying the location and/or orientation of the antennas 16 and 18, adjusting the booster gain, and changing the location of the mobile unit 12 while the mobile unit simultaneously displays the resulting effects on the signal strength of the mobile unit and the base unit on a common display.

By having access to the booster operation on the mobile device 12, the booster may be remotely monitored and controlled from the mobile device. When monitoring the booster, the various factors that control quality are communicated to the user through an overall signal strength display. This is particularly useful when determining the ideal locations for antennas during initial installation. The remote control functionality running on the mobile unit can also be used to detect and assist in correcting any problem that the booster may encounter during operation, such as a dislodged or damaged antenna, a loss of power to the booster, a communication line failure, and so forth. To further assist in the monitoring process, the booster control application 13 running on the mobile device 12 can be setup to trigger a notification when various conditions or faults are found on the booster and thus act as an alarm for the user. These triggers can correspond to events occurring in the booster, for example by causing a GUI for the remote control application 13 to become activate when a predefined trigger occurs. The booster control application 13 can also be used to configure the trigger and implement response actions, such as changing the amplifier gain, restarting the base unit, checking the power, and checking the antenna positions and cable connections.

The remote control application 13 running on the mobile device 12 may also be used to shut down the booster, or limit the functionality of the booster, if the booster is determined to have any issues. The mobile device may also be used to register the booster with the manufacturer or wireless licensee before it becomes functional and otherwise support activation of the booster. The remote control application 13 running on the mobile device 12 may also allow a third party, such as the manufacturer, repair technician or service provide, to access and control the booster via the mobile device. The service provider, for example, may be able to adjust the operation of the base station providing service to the booster, while the user observes the effect on the signal strength displays in the mobile unit. The user may also register the booster and communications may be sent to the wireless service provider when appropriate. For example, the service provider may have the ability to approve, activate or control when the booster can be activated.

The operation frequency may be a configurable parameter for certain boosters and the booster may be designed to operate on a subset of an operational frequency band. This frequency of operation can be determined by location, and may access a remote database to assist; or this information can come from the licensee itself. The wireless service provider may therefore have the ability to configure this parameter in the booster 11 via the communication interface provided by the booster control application 13 running on the mobile device 12. The service provider may also be given access to the booster to troubleshoot, configure, download software or firmware updates, and perform other functions on or for the booster via the booster control application 13 running on the mobile device 12.

In addition, the remote control application 13 running on the mobile device 12 may be configured to continually transmit autonomous registration signals 26 on the short-range communication channel. This allows the booster 20 to detect when the mobile unit 12 has come into and gone out of range. As a result, the booster may be configured to activate the bidirectional amplifier 15 when a mobile unit that it supports (e.g., a mobile unit that uses a frequency or carrier supported by the booster) comes into the range of the short-range communication channel. The booster also shuts down the bidirectional amplifier 15 when the mobile unit 12 moves out of the range of the short-range communication channel, typically after failing to receive a mobile unit registration signal for a period of time. In this manner, the booster may automatically activate its bidirectional amplifier only when a mobile unit that it supports is within range of the short-range communication channel. The booster and mobile may also performs other configuration functions during the registration process, such as channel or carrier selection, gain adjustment, selection of an error correction protocol, exchange of a software update, license verification and so forth.

Figure 2:
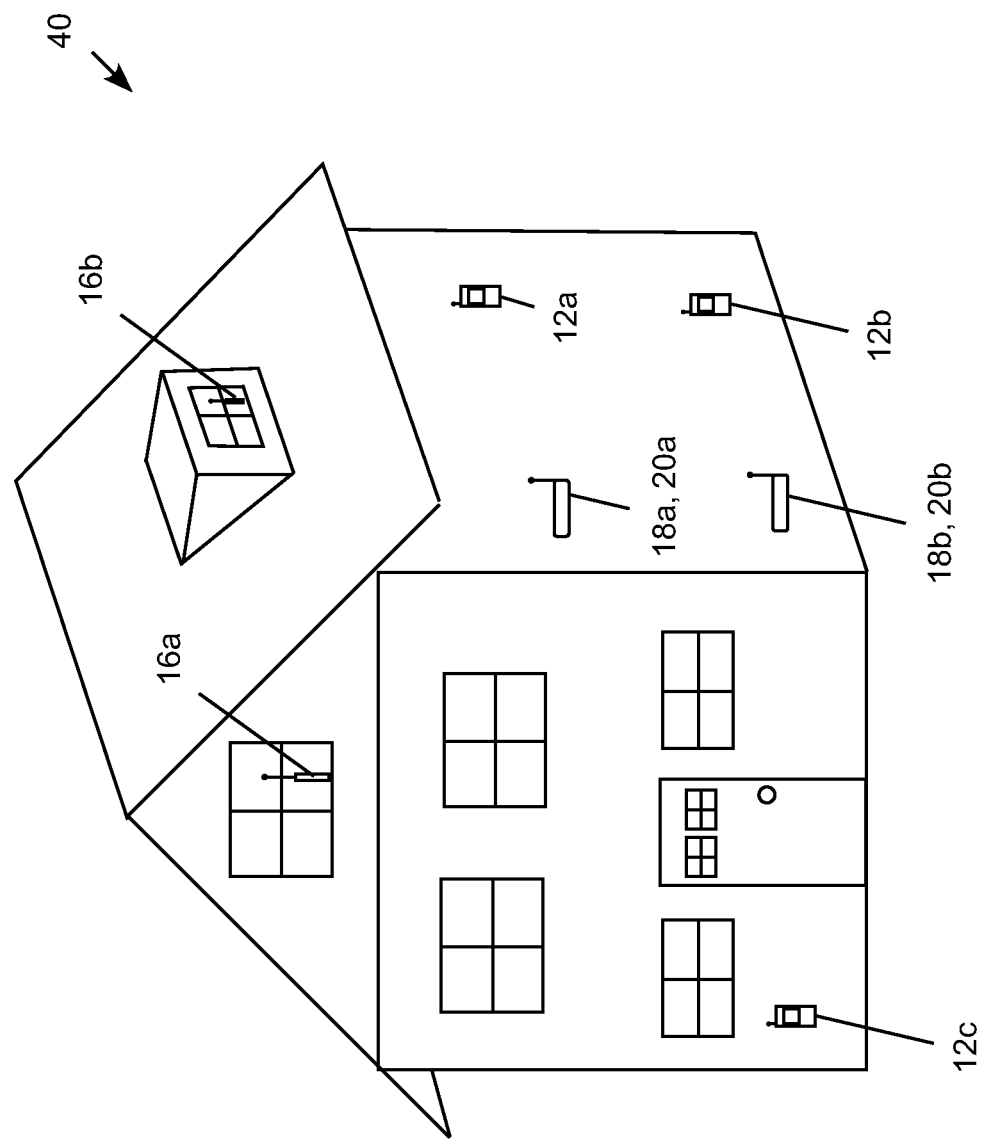
FIG. 2 is a conceptual block diagram showing a range of antenna location options for wireless signal booster evaluated using the remote control application.

FIG. 2 is a conceptual block diagram showing a range of antenna location options for wireless signal booster evaluated using the remote control application. For example, the user may locate the tower-side antenna in a number of locations illustrated by the tower-side antennas 16a and 16b positioned in windows in an attic or top floor of the user's premises 40. Similarly, the user may locate the mobile-side antenna in a number of locations illustrated by the mobile-side antennas 18a and 18b positioned in different locations in the premises 40 where the user wants to receive improved wireless service. In this example, the mobile-side antennas 18a and 18b are integral with the base units 20a and 20b, respectively. The user can the carry the mobile unit around to different locations illustrated by the mobile units 12a-c and view on a common display the signal strength indicators for the booster and the mobile unit while varying parameters such as the tower-side antenna location and orientation, the mobile-side antenna location and orientation, and the booster gain setting are varied.

Figure 3:
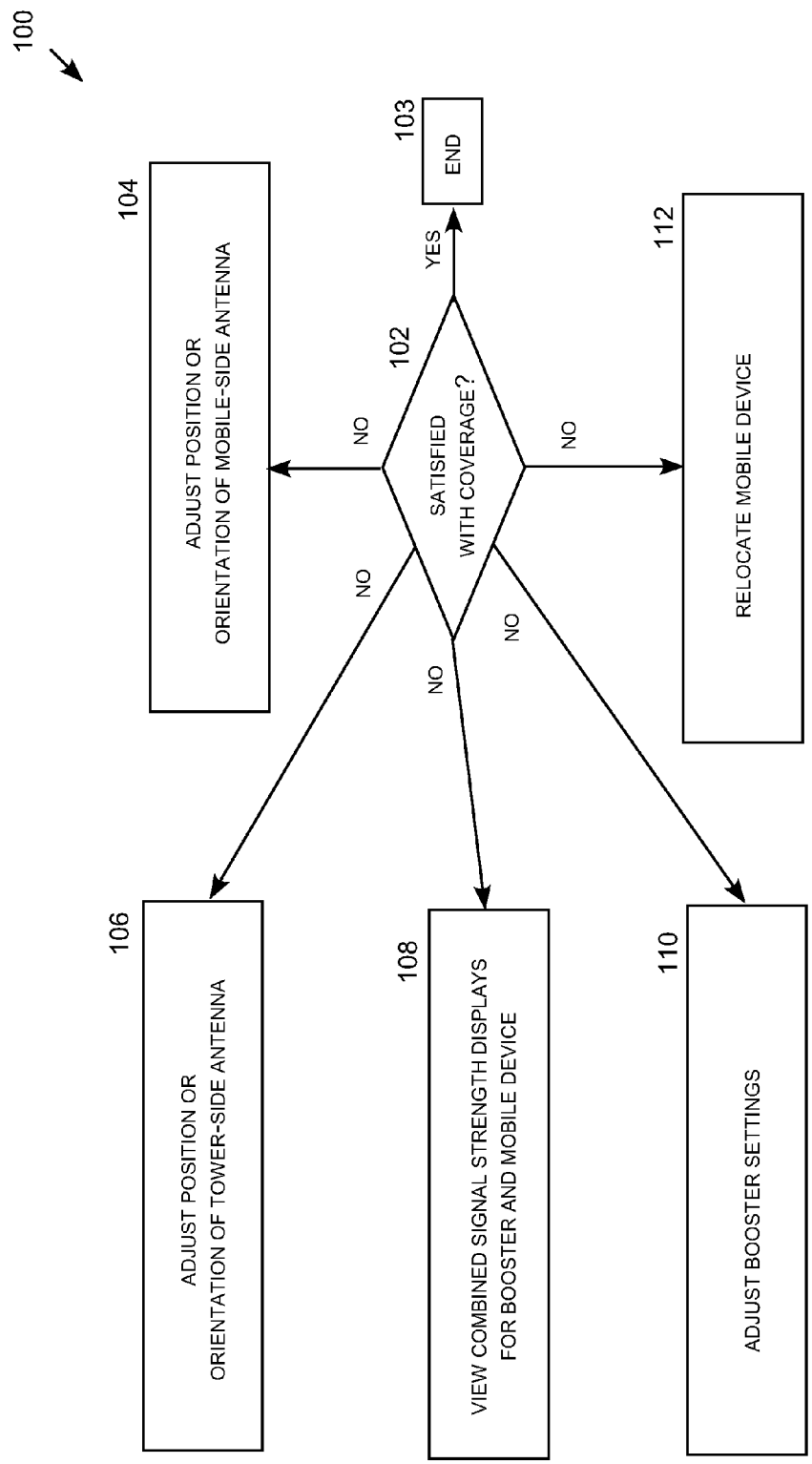
FIG. 3 is a conceptual a logic diagram for locating the antennas of the wireless signal booster using the remote control application.

FIG. 3 is a conceptual a logic diagram 100 for locating the antennas of the wireless signal booster using the remote control application. As illustrated by the decision step 102, the user may alter the various parameters until the user is satisfied with the booster configuration. If the user is satisfied with the booster configuration, the "yes" branch is followed to the "end" step 103 where the user enjoys the improved wireless communication service provided by the booster. If the is not satisfied with the booster configuration, any of the "no" branches may be followed, as selected by the user in an ad-hoc manner. For example in step 104 the user or a person assisting the user adjusts the position or orientation of the mobile-side antenna. In step 108, the user views the booster and mobile unit signal strength indicators displayed on the common display of the mobile unit to determine whether is then satisfied with the satisfied with the booster configuration. If the user is still not satisfied, in step 106 the user or a person assisting the user adjusts the position or orientation of the tower-side antenna while the user views the resulting changes on the signal strength indicators. Again, if the user is still not satisfied, in step 110 the user adjusts booster settings, such as the gains setting or frequency channel selection. In step 112 the user may also move around with the mobile device and repeat the parameter options while viewing the resulting changes on the signal strength indicators.

It should be understood that the foregoing relates only to the exemplary embodiments of the present invention, and that numerous changes may be made therein without departing from the spirit and scope of the invention as defined by the following claims.

The invention claimed is:

1. A wireless repeater system comprising:
a wireless repeater comprising a short-range antenna associated with a short-range communication channel, a tower-side antenna, a mobile-side antenna, and a base unit comprising a bidirectional amplifier operative for amplifying and repeating duplex telecommunication signals transmitted over the tower-side and mobile-side antennas;
an external device operative to communicate with the wireless repeater via the short-range antenna;
a remote booster application running on the wireless repeater cooperatively operating with a remote booster application running on the external device via communications transmitted over the short-range antenna;
the remote booster application running on the external device and the remote booster application running on the wireless repeater operative for autonomous registration over the short-range communication; and
the wireless repeater operative for activating the bidirectional amplifier in response to the autonomous registration, and deactivating the bidirectional amplifier in response to absence of the autonomous registration for a predetermined period;
a first signal strength indicator located on the external device operative to display signal strength information received from the wireless repeater;
wherein the signal strength information is transmitted from the wireless repeater to the external device via the short-range antenna without utilizing the tower-side antenna or the mobile-side antenna; and
wherein the first signal strength indicator displays signal strength information for communications received by the wireless repeater via the tower-side antenna.

2. The wireless repeater system of claim 1, wherein the external device is further operative to remotely control a gain setting of the wireless repeater via signals transmitted to the wireless repeater via the short-range antenna.

3. The wireless repeater system of claim 2 wherein:
the external device receives communications from the wireless repeater via the mobile-side antenna;
the external device further comprises a second signal strength indicator for displaying signal strength information for the communications received by the external device from the mobile-side antenna of the wireless repeater; and a first and second signal strength indicators are displayed simultaneously on the external device.

4. The wireless repeater system of claim 3, wherein the remote booster application running on the external device implements remote control functionality allowing the external device to remotely control the wireless booster via communications transmitted over the short-range antenna without utilizing the tower-side antenna or the mobile-side antenna.

5. The wireless repeater system of claim 4, wherein the remote booster application running on the external device further operates as an intermediary communication entry point for accessing the booster via communications transmitted from the external device to the booster over the short-range antenna.

6. The wireless repeater system of claim 5, wherein the mobile device is configured to communicate with a remote support application via a communication link utilizing the tower-side and mobile-side antennas of the wireless booster.

7. The wireless repeater system of claim 5, wherein the mobile device is configured to communicate with the remote support application via a communication link without utilizing the tower-side and mobile-side antennas of the wireless booster.

8. A wireless repeater system comprising:
a wireless repeater comprising a short-range antenna associated with a short-range communication channel, a tower-side antenna, a mobile-side antenna, and a base unit comprising a bidirectional amplifier operative for amplifying and repeating duplex telecommunication signals transmitted over the tower-side and mobile-side antennas;
a mobile device operative to receive repeated and amplified communications from the wireless repeater via the mobile-side antenna while also receiving short-range communications from the wireless repeater via the short-range antenna;
a remote booster application running on the wireless repeater cooperatively operating with a remote booster application running on the external device via communications transmitted over the short-range channel;
a first signal strength indicator located on the mobile device operative to display signal strength information received from the wireless repeater via the short-range antenna indicating the strength of communications received by the wireless repeater via the tower-side antenna;
a second signal strength indicator for displaying signal strength information for the communications received by the mobile device from the mobile-side antenna of the wireless repeater;
wherein the mobile device is further operative to remotely control a gain setting of the wireless repeater via signals transmitted to the wireless repeater via the short-range antenna; and
wherein the first and second signal strength indicator are displayed simultaneously on the mobile device.

9. The wireless repeater system of claim 8, wherein the remote booster application running on the mobile device implements remote control functionality allowing the mobile device to remotely control the wireless booster via communications transmitted over the short-range antenna without utilizing the tower-side antenna or the mobile-side antenna.

10. The wireless repeater system of claim 8, wherein the remote booster application running on the mobile device further operates as an intermediary communication entry point for accessing the booster via communications transmitted from the mobile device to the booster over the short-range antenna.

11. The wireless repeater system of claim 8, wherein the mobile device is configured to communicate with a remote support application via a communication link utilizing the tower-side and mobile-side antennas of the wireless booster.

12. The wireless repeater system of claim 8, wherein the mobile device is configured to communicate with the remote support application via a communication link without utilizing the tower-side and mobile-side antennas of the wireless booster.

13. The wireless repeater system of claim 8, wherein:
the remote booster application running on the external device and the remote booster application running on the wireless repeater operative for autonomous registration over the short-range communication; and
the wireless repeater operative for activating the bidirectional amplifier in response to the autonomous registration, and deactivating the bidirectional amplifier in response to absence of the autonomous registration for a predetermined period.

\* \* \* \* \*